(12) United States Patent
Elsayed et al.

(10) Patent No.: US 9,942,847 B2
(45) Date of Patent: Apr. 10, 2018

(54) APPARATUS, SYSTEM, AND METHOD FOR ADAPTIVE SLEEP SCHEDULE FOR CONTROL SIGNAL DECODING

(71) Applicant: Apple Inc., Cupertino, CA (US)

(72) Inventors: Moustafa M. Elsayed, Los Gatos, CA (US); Tarik Tabet, Los Gatos, CA (US); Konstantinos Sarrigeorgidis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 14/987,805

(22) Filed: Jan. 5, 2016

(65) Prior Publication Data

US 2016/0219519 A1    Jul. 28, 2016

Related U.S. Application Data

(60) Provisional application No. 62/106,627, filed on Jan. 22, 2015.

(51) Int. Cl.
*G08C 17/00* (2006.01)
*H04W 52/02* (2009.01)

(52) U.S. Cl.
CPC ... *H04W 52/0225* (2013.01); *H04W 52/0216* (2013.01); *H04W 52/0229* (2013.01); *H04W 52/0274* (2013.01); *Y02B 60/50* (2013.01)

(58) Field of Classification Search
CPC ......... H04W 52/0225; H04W 52/0216; H04W 52/0229; H04W 52/0274; Y02B 60/50
USPC .......... 370/252–311, 329–345; 455/450–574
See application file for complete search history.

(56) References Cited

U.S. PATENT DOCUMENTS

| 6,473,607 | B1 * | 10/2002 | Shohara | H04W 52/0216 340/7.32 |
| 7,197,341 | B2 * | 3/2007 | Bultan | H04W 52/0248 455/343.2 |
| 8,073,470 | B1 * | 12/2011 | Collins | H04W 68/00 455/458 |
| 8,270,932 | B2 * | 9/2012 | Kim | H04W 52/0235 370/318 |
| 8,385,878 | B2 * | 2/2013 | Rao | H04W 52/028 455/127.5 |

(Continued)

*Primary Examiner* — Man Phan
(74) *Attorney, Agent, or Firm* — Meyertons Hood Kivlin Kowert & Goetzel, P.C.; Jeffrey C. Hood; Joel L. Stevens

(57) ABSTRACT

This disclosure relates to implementing an adaptive sleep schedule for PDCCH decoding. In some embodiments, prior to receiving PDCCH signaling, a user equipment device may schedule wireless communication circuitry to prepare for and decode the PDCCH signaling, which may include dynamically preparing a first interrupt for the wireless communication circuitry to perform the preparing for and the decoding. In response to the first interrupt, the UE may prepare for and decode the PDCCH signaling using the wireless communication circuitry. The UE may analyze the result of the decoding, which may include determining that the PDCCH signaling does not comprise information for the UE. In response to determining that the PDCCH signaling does not comprise information for the UE, the UE may schedule the wireless communication circuitry to shut down, which may include dynamically preparing a second interrupt to shut down the wireless communication circuitry.

17 Claims, 8 Drawing Sheets

(56) References Cited

U.S. PATENT DOCUMENTS

| | | | | |
|---|---|---|---|---|
| 8,462,746 | B2* | 6/2013 | Bitran | H04L 5/0087 |
| | | | | 370/329 |
| 8,488,506 | B2* | 7/2013 | Husted | H04W 52/0293 |
| | | | | 370/311 |
| 8,830,859 | B2* | 9/2014 | Weng | H04W 52/52 |
| | | | | 370/252 |
| 8,897,818 | B2 | 11/2014 | Weng et al. | |
| 9,008,734 | B2* | 4/2015 | Vummintala | H04W 28/0263 |
| | | | | 370/329 |
| 9,265,004 | B2* | 2/2016 | Almog | H04W 52/0229 |
| 9,317,105 | B2* | 4/2016 | Chueh | G06F 1/329 |
| 2013/0301508 | A1 | 11/2013 | Almog et al. | |
| 2015/0334709 | A1* | 11/2015 | Ji | H04W 72/0453 |
| | | | | 370/330 |

* cited by examiner

APPARATUS, SYSTEM, AND METHOD FOR ADAPTIVE SLEEP SCHEDULE FOR CONTROL SIGNAL DECODING

PRIORITY INFORMATION

This application claims priority to U.S. provisional patent application Ser. No. 62/106,627, entitled "Apparatus, System, and Method for Adaptive Sleep Schedule for PDCCH Decoding," filed Jan. 22, 2015, which is hereby incorporated by reference in its entirety as though fully and completely set forth herein.

FIELD

The present application relates to wireless devices, and more particularly to an apparatus, system, and method for implementing an adaptive sleep schedule for control signal decoding.

DESCRIPTION OF THE RELATED ART

Wireless communication systems are rapidly growing in usage. Further, wireless communication technology has evolved from voice-only communications to also include the transmission of data, such as Internet and multimedia content. A user equipment (UE) also generally provides other functionality, such as applications, that are desired by users. Accordingly, the large amount of functionality present in UEs, e.g., wireless devices such as cellular phones, can place a significant strain on the battery life of the UE.

SUMMARY

Embodiments described herein relate to an apparatus, system, and method for implementing an adaptive sleep schedule for control signaling decoding.

In some embodiments, a method may include, at a user equipment device (UE) comprising wireless communication circuitry for communicating with a cellular network, prior to receiving physical downlink control channel (PDCCH) signaling, scheduling the wireless communication circuitry to prepare for and decode the PDCCH signaling. Scheduling the wireless communication circuitry may include dynamically preparing a first interrupt for the wireless communication circuitry to perform the preparing and the decoding. In response to the first interrupt, the UE may prepare for and decode the PDCCH signaling using the wireless communication circuitry. After decoding the PDCCH signaling, the UE may store a result of the decoding. The UE may analyze the result of the decoding, which may include determining that the PDCCH signaling does not comprise information for the UE. In response to determining that the PDCCH signaling does not comprise information for the UE, the UE may schedule the wireless communication circuitry to shut down, which may include dynamically preparing a second interrupt to shut down the wireless communication circuitry. In response to the second interrupt, the UE may shut down the wireless communication circuitry.

The techniques described herein may be implemented in and/or used with a number of different types of devices, including but not limited to cellular phones, portable media players, portable gaming devices, tablet computers, wearable computing devices, remote controls, wireless speakers, set top box devices, television systems, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the embodiments is considered in conjunction with the following drawings.

Figure 1:
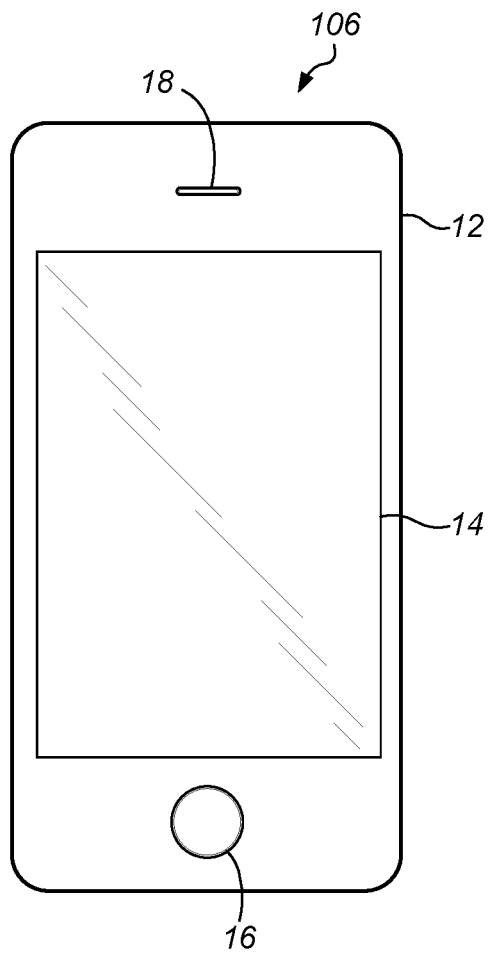
FIG. 1 illustrates an example user equipment (UE) according to some embodiments.

While the features described herein may be susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
TDS: Time Division Synchronous Code Division Multiple Access
LTE: Long Term Evolution
RAT: Radio Access Technology
TX: Transmit
RX: Receive
AGC: Automatic Gain Control
TTL: Time Tracking Loop
FTL: Frequency Tracking Loop
CHEST: Channel Estimation Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates an example user equipment (UE) 106 according to some embodiments. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Time Division Synchronous Code Division Multiple Access (TD- SCDMA or TDS), Long Term Evolution (LTE), Advanced LTE, and/or other RATs. For example, the UE 106 may support at three RATs, such as GSM, TDS, and LTE. Various different or other RATs may be supported as desired.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains, e.g., that operate on the same frequency. In another embodiment, the UE 106 comprises two or more radios, i.e., two or more TX/RX chains (two or more TX chains and two or more RX chains).

The UE 106 may comprise two antennas that may be used to communicate using two or more RATs. For example, the UE 106 may have a pair of cellular telephone antennas coupled to a single radio or shared radio. The antennas may be coupled to the shared radio (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain. The first and second receiver chains may share a common local oscillator, which means that both of the first and second receiver chains tune to the same frequency. The first and second receiver chains may be referred to as the primary receiver chain (PRX) and the diversity receiver chain (DRX).

In some embodiments, the PRX and DRX receiver chains operate as a pair and time multiplex among two or more RATs, such as LTE and one or more other RATs such as GSM or CDMA1×. In one embodiment described herein the UE 106 comprises one transmitter chain and two receiver chains (PRX and DRX), wherein the transmitter chain and the two receiver chains (acting as a pair) time multiplex between two (or more) RATs, such as LTE and GSM.

Each antenna may receive a wide range of frequencies such as from 600 MHz up to 3 GHz. Thus, for example, the local oscillator of the PRX and DRX receiver chains may tune to a specific frequency such as an LTE frequency band, where the PRX receiver chain receives samples from antenna 1 and the DRX receiver chain receives samples from antenna 2, both on the same frequency (since they use the same local oscillator). The wireless circuitry in the UE 106 can be configured in real time depending on the desired mode of operation for the UE 106. In some embodiments described herein, the UE 106 is configured to support LTE and GSM radio access technologies, although other combinations are also envisioned, such as LTE and CDMA.

Figure 2:
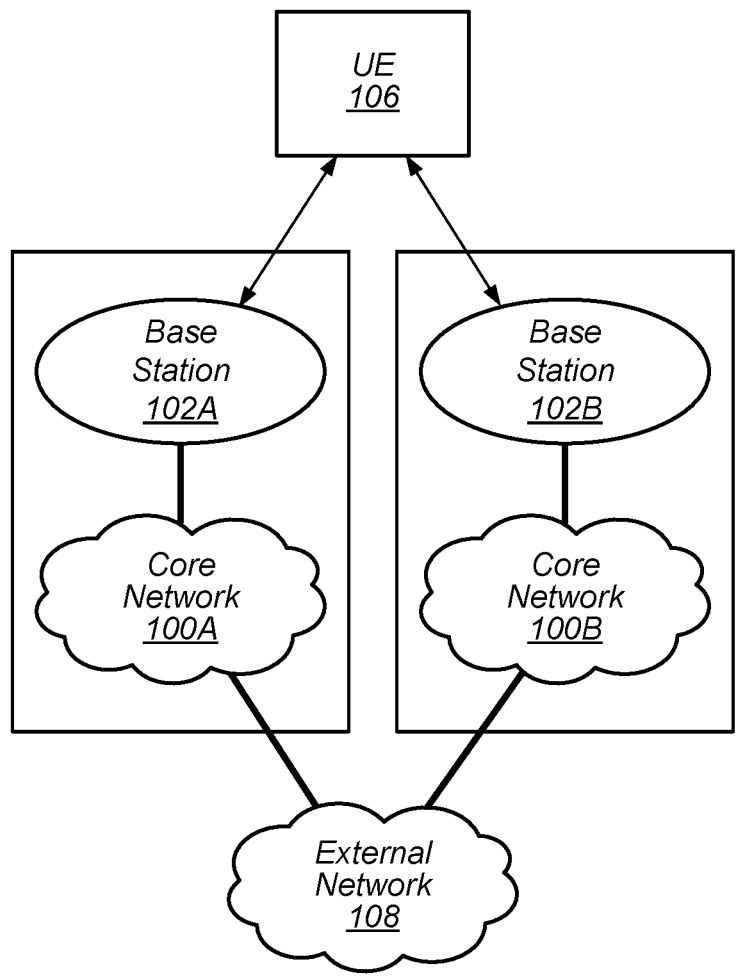
FIG. 2 illustrates an example wireless communication system where a UE communicates with two base stations using two different RATs.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the core networks 100 may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA, TD-SCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, TDS, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and TDS, LTE and GSM and TDS, and/or any other combination of RATs) might be coupled to a network or service provider that also supports the different cellular communication technologies. In some embodiments, the UE 106 may be configured to use a first RAT that includes packet-switched technology (e.g., LTE) and a second RAT that includes circuit-switched technology (e.g., GSM or TDS).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
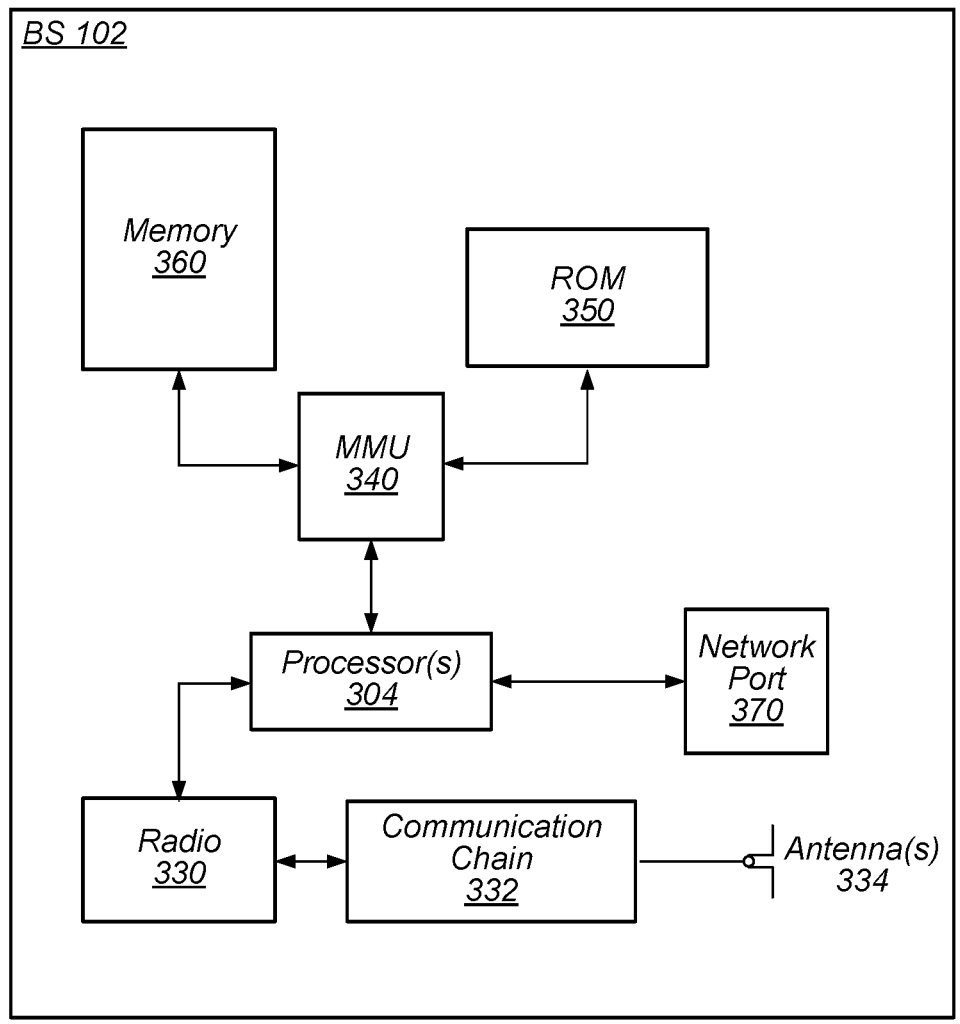
FIG. 3 is an example block diagram of a base station, according to some embodiments.

FIG. 3—Base Station

FIG. 3 illustrates an exemplary block diagram of a base station 102. It is noted that the base station of FIG. 3 is merely one example of a possible base station. As shown, the base station 102 may include processor(s) 304 which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices 106 serviced by the cellular service provider).

The base station 102 may include at least one antenna 334. The antenna(s) 334 may be configured to operate as a wireless transceiver and may be further configured to communicate with UE devices 106 via radio 530. The antenna(s) 334 communicates with the radio 330 via communication chain 532. Communication chain 332 may be a receive chain, a transmit chain or both. The radio 330 may be configured to communicate via various RATs, including, but not limited to, LTE, GSM, TDS, WCDMA, CDMA2000, etc.

The processor(s) 304 of the base station 102 may be configured to implement part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof.

Figure 4:
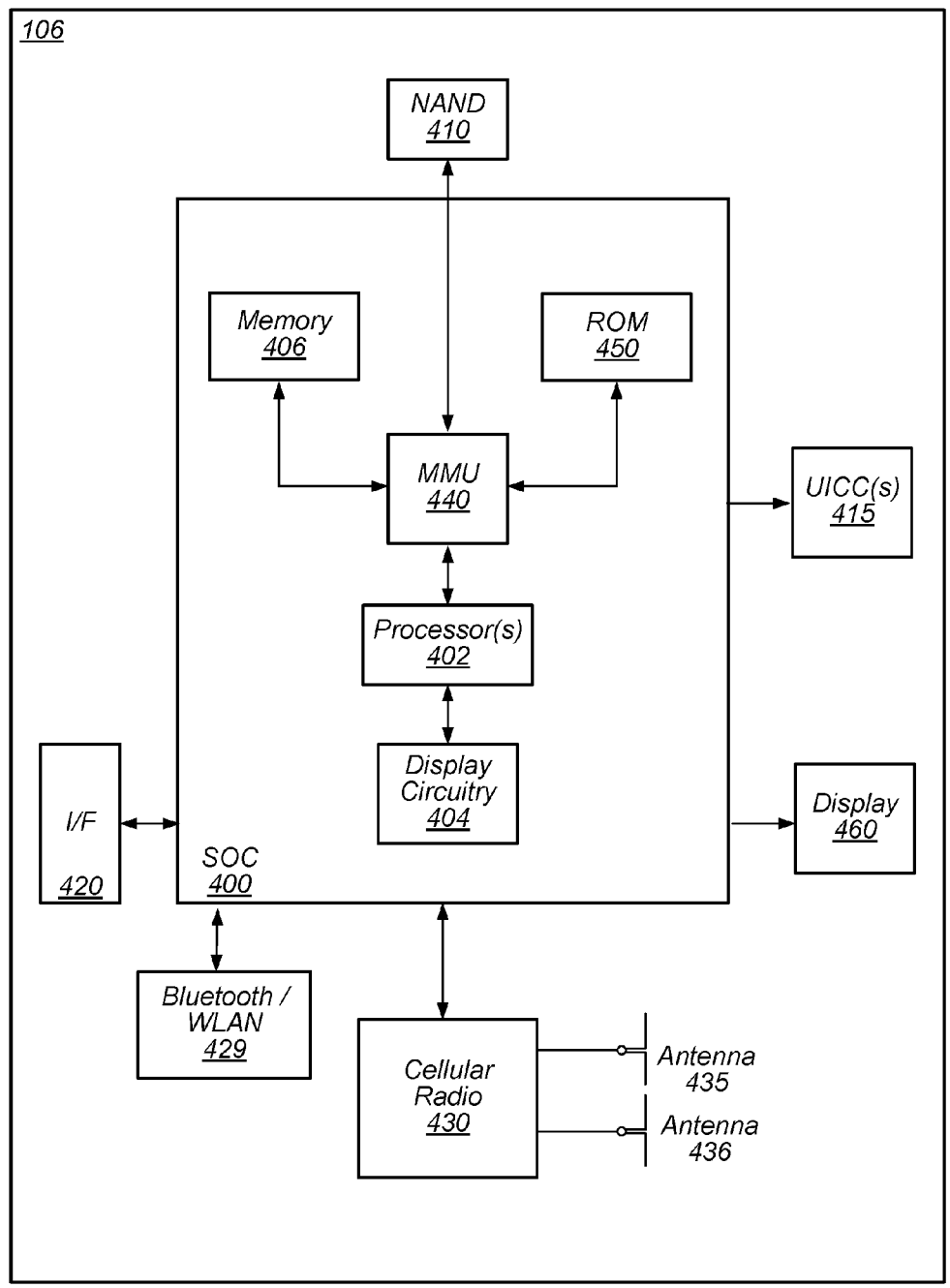
FIG. 4 is an example block diagram of a UE, according to some embodiments.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include_various types of memory (e.g., including NAND flash 410), a connector interface 420 (e.g., for coupling to a computer system, dock, charging station, etc.), a display 460, cellular communication circuitry 430 such as for LTE, GSM, TDS, CDMA, etc., and short range wireless communication circuitry 429 (e.g., Bluetooth and WLAN circuitry). The UE 106 may further comprise one or more smart cards 415 that comprise SIM (Subscriber Identity Module) functionality, such as one or more UICC(s) (Universal Integrated Circuit Card(s)) cards 415. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In some embodiments, as noted above, the UE 106 comprises at least one smart card 415, such as a UICC 415, which executes one or more Subscriber Identity Module (SIM) applications and/or otherwise implements SIM functionality. The at least one smart card 415 may be only a single smart card 415, or the UE 106 may comprise two or more smart cards 415. Each smart card 415 may be embedded, e.g., may be soldered onto a circuit board in the UE 106, or each smart card 415 may be implemented as a removable smart card. Thus the smart card(s) 415 may be one or more removable smart cards (such as UICC cards, which are sometimes referred to as "SIM cards"), and/or the smart card(s) 415 may be one or more embedded cards (such as embedded UICCs (eUICCs), which are sometimes referred to as "eSIMs" or "eSIM cards"). In some embodiments (such as when the smart card(s) 415 include an eUICC), one or more of the smart card(s) 415 may implement embedded SIM (eSIM) functionality; in such an embodiment, a single one of the smart card(s) 415 may execute multiple SIM applications.

The inclusion of two or more SIM smart cards 415 in the UE 106 may allow the UE 106 to support two different telephone numbers and may allow the UE 106 to communicate on corresponding two or more respective networks. For example, a first smart card 415 may comprise SIM functionality to support a first RAT such as LTE, and a second smart card 415 may comprise SIM functionality to support a second RAT such as GSM or CDMA. Other implementations and RATs are of course possible.

As noted above, the UE 106 may be configured to communicate wirelessly using multiple radio access technologies (RATs). As further noted above, in such instances, the cellular communication circuitry (radio(s)) 430 may include radio components which are shared between multiple RATS and/or radio components which are configured exclusively for use according to a single RAT. Where the UE 106 comprises at least two antennas, the antennas 435 and 436 may be configurable for implementing MIMO (multiple input multiple output) communication.

The UE 106 may include hardware and software components for implementing the features described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 429, 430, 435, 436, 440, 450, 460 may be configured to implement part or all of the features described herein.

Figure 5:
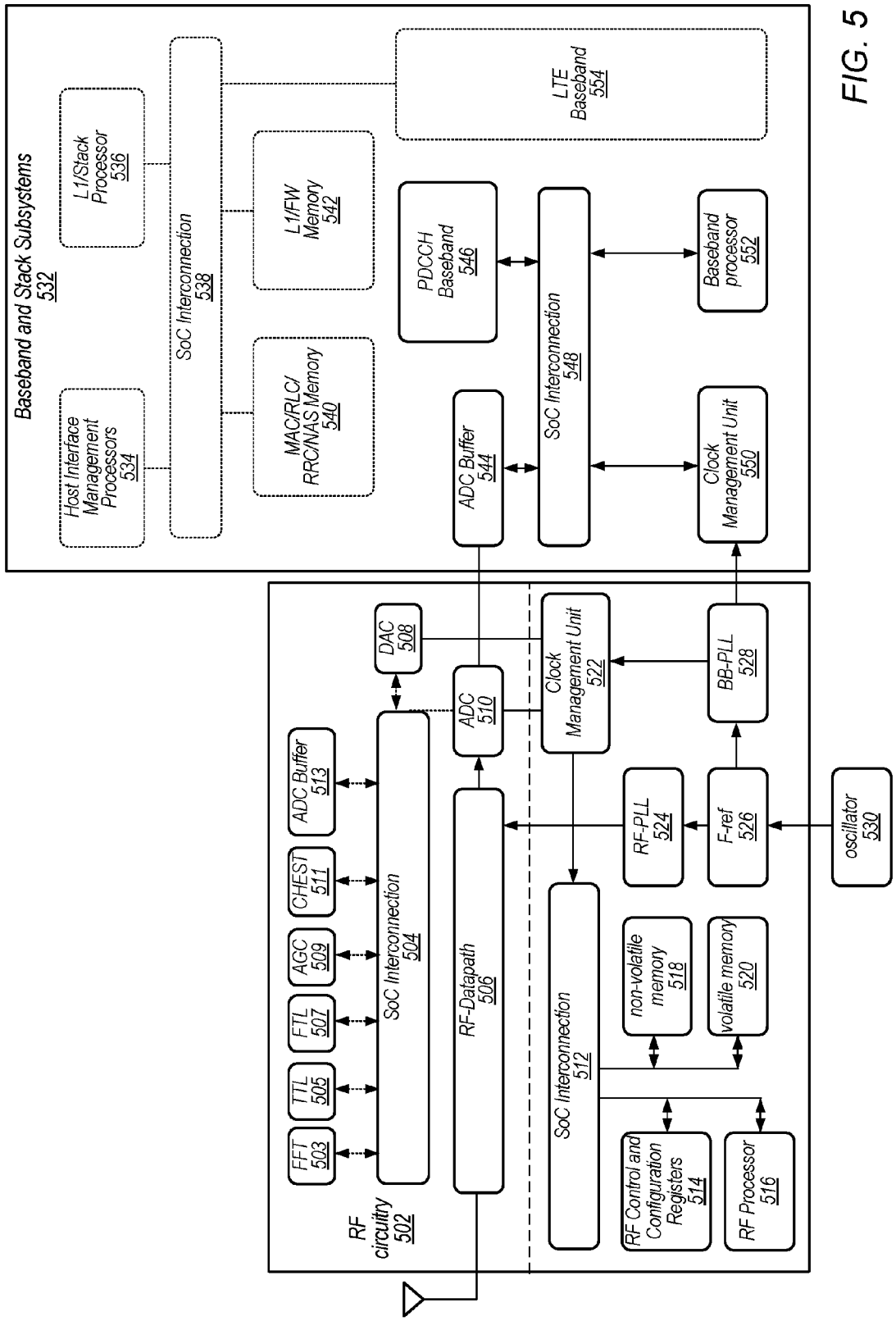
FIG. 5 is an example block diagram of wireless communication circuitry of a UE, according to some embodiments.

FIG. 5—Exemplary Wireless Communication Circuitry of a UE

FIG. 5 illustrates a block diagram of exemplary wireless communication circuitry of a UE, e.g., for performing cellular communication. In some embodiments, the wireless communication circuitry of FIG. 5 may correspond to at least a portion of the cellular radio 430 of FIG. 4. As shown, the UE includes both radio frequency (RF) circuitry (e.g., RF integrated circuit (IC)) 502 and baseband and stack subsystems 532 (also referred to as "baseband circuitry"). The UE also includes an oscillator 530, which may be a crystal oscillator.

As shown, the oscillator 530 may deliver F-ref 526. F-ref 526 may be the main reference frequency delivered by the oscillator 530 upon reaching its stable state. The oscillator 530 may be coupled to the RF-PLL (phase locked loop) 524 and the BB-PLL 528. The RF-PLL is the RF phase locked loop that may be used to deliver the reference clock for the RF-Datapath. The BB-PLL 528 is the baseband circuitry phase locked loop, which may be used to lock the reference clock for the baseband circuitry 532.

The RF-PLL is coupled to the RF-datapath 506, which is coupled to one or more antenna(s) (e.g., the antennas 435 and 436) as well as the ADC (analog to digital converter) 510. The RF-datapath 506 may include components used to prepare the signal to be transmitted/received by the antenna. The ADC may be used to convert from analog signal(s) to IQ-samples.

The BB-PLL 528 may be coupled to a clock management unit 522, which may be used to manage the different clocks rates delivered to the baseband/RF interface. The clock management unit 522 may be coupled to both the ADC 510 and the DAC (digital to analog converter) 508. The DAC 508 may be used to convert IQ-samples to analog signal(s). Both the ADC 510 and the DAC 508 may be coupled to the SoC interconnection 504. Additionally, FFT (fast fourier transform) 503, TTL (time tracking loop) 505, FTL (frequency tracking loop) 507, AGC (automatic gain control) 509, CHEST (channel estimation) 511, and ADC Buffer 513 blocks may be coupled to the SoC Interconnection 504. These blocks may allow the RF circuitry to prepare for PDCCH processing without assistance from the baseband circuitry.

The clock management unit 522 may also be coupled to the SoC interconnection 512, which may be coupled to the RF processor 516 (e.g., which may be referred to as the "RF microprocessor" below), the RF control and configuration registers 514, the non-volatile memory 518, and the volatile memory 520. The RF control and configuration registers may be registers used to control the work flow of the RF circuitry and to configure its different components. The SoC (System-on-Chip) interconnections may also be referred to as NoC (Network-on-Chip). These interconnections may be the bus system which is used so that the different components can communicate with each other according to a bus protocol. For example, this bus may be used when a processor requests memory words, memory responds with the request words, and so on. In some embodiments, while each SoC interconnection (e.g., 504, 512, 548, and 538) each have their own reference number, they may refer to a same system or functionality.

The RF processor 516 may control tasks required to prepare for reception (Rx) after waking up from sleep, e.g., instead of being controlled by the baseband processor 552. The non-volatile memory (or non-volatile RAM) 518, which may be implemented as flash memory, may store various settings, code, etc. while the RF circuitry 502 is in a sleep state. For example, the non-volatile memory may store the code, which is executed by the RF processor 516. The volatile memory 520 (or RAM) may be the memory used by the RF processor 516. For example, after waking up from a sleep state, the RF processor 516 may transfer the code and the data required for its operation from the non-volatile memory 518 to the volatile memory 520. At this point, the code may be executed by the RF processor 516. This process may be referred to as the boot process, e.g., of the RF circuitry 502.

As shown, the baseband and stack subsystems 532 include a variety of components. For example, the BB-PLL 528 of the RF circuitry 502 is coupled to the clock management unit 550 that may manage the different clock rates delivered to the baseband circuitry components. The clock management unit may be coupled to the SoC interconnection 548, which in turn may be coupled to the ADC Buffer 544, the PDCCH baseband 546, and the baseband processor 552. The PDCCH baseband 546 may be the baseband block configured to receive PDCCH. The ADC buffer 544 may store data from the ADC 510 (e.g., the IQ samples).

The baseband processor 552 (sometimes referred to as baseband microprocessor) may generally be used to control the signal processing data path (transmission(Tx)/reception (Rx)). The baseband processor 552 may be used as the global scheduler for activities that are performed on the antenna. If there is not an RF processor, then the baseband processor 552 may be used to schedule the RF circuitry activities as well.

The SoC interconnection 548 may be coupled to the host interface management processor 546, the L1/Stack processor 536, the MAC/RLC/RRC/NAS memory 540, the L1/FW memory 542, and the LTE baseband 554. The host interface management processor 546 may be used the application processor(s) used for user interface, graphical processor, and others. The L1/Stack processor 536 may be the processor devoted for the code of LTE-stack and L1-control. The MAC/RLC/RRC/NAS memory 540 may be the memory used by the components associated with processing at the MAC, RLC, RRC, and NAS layers. The L1/FW memory 542 may be the memory used by L1-driver and the Firmware. Finally, the LTE baseband 554 may be the baseband block configured to perform the LTE signal processing required to serve the physical channels except, for example, PDCCH.

Adaptive Sleep Schedule for PDCCH Decoding

Wireless communication has various timing resolutions. As one particular example, LTE has four timing resolution domains: a radio frame (e.g., "T_frame")=10 ms, a radio slot (e.g., "T_slot")=0.5 ms or T_frame/20, a transmit time interval (TTI)=1 ms or 2*T_slot, and an orthogonal frequency domain multiplexing (OFDM) symbol (e.g., with a normal cyclic prefix, "T_ofdm")=T_slot/7 or 0.07143 ms.

PDCCH decoding may involve determining that there is an assignment for a mobile device or determining that there is no assignment. Because the "No-PDCCH-Assignment" case occurs frequently (e.g., 80-90% of the time), it may be an important situation to consider for mobile devices, e.g., for reducing battery consumption. Various embodiments may be used for PDCCH-assignment.

In a first embodiment, where the mobile device includes a vector processor, layer 1 processing (e.g., a processor executing L1 software, such as L1/Stack processor 536) may schedule its requests to the vector processor based on T_frame. In this embodiment, the vector processor may require that all tasks are scheduled a priori for the whole frame since it cannot be interrupted during its signal processing tasks. Accordingly, for this architecture, it may not be possible to shut down the main components of the system (specifically the vector processor), and accordingly this embodiment may allow only pseudo-power saving by shutting some secondary components down.

In a second embodiment, the mobile device may include small cores (e.g., 6 to 10 cores) which are responsible for small tasks in the system. During the reception of PDCCH, only some of the cores may be switched on (e.g., normally 3 cores), which may schedule the PDCCH activities and route them to the hardware (e.g., RF and baseband circuitry). Since the system is highly distributed, it may be difficult to handle a schedule with a resolution less than the TTI interrupt. Even with this schedule resolution, the time required to serve the No-PDCCH-Assignment use case may take around 40 ms, e.g., because the main core, which schedules L1 activities, may have a T_frame-based schedule.

In a third embodiment, which may be implemented largely in hardware, the mobile device may include a core to schedule all the L1-activities required. In this embodiment, the hardware may have state machines which may be configured, triggered to start, and may deliver results based on a slot interrupt. In this embodiment, the TTI-schedule may be performed on the level of L1 to request the different activities from the HW in the next TTI. Additionally, slot-execution may be performed by the hardware. In this embodiment, a slot interrupt may be generated (e.g., regardless of whether a task should be performed) every slot to allow this execution. This embodiment may use 4 ms to shut down in the No-PDCCH-Assignment case.

Figure 6:
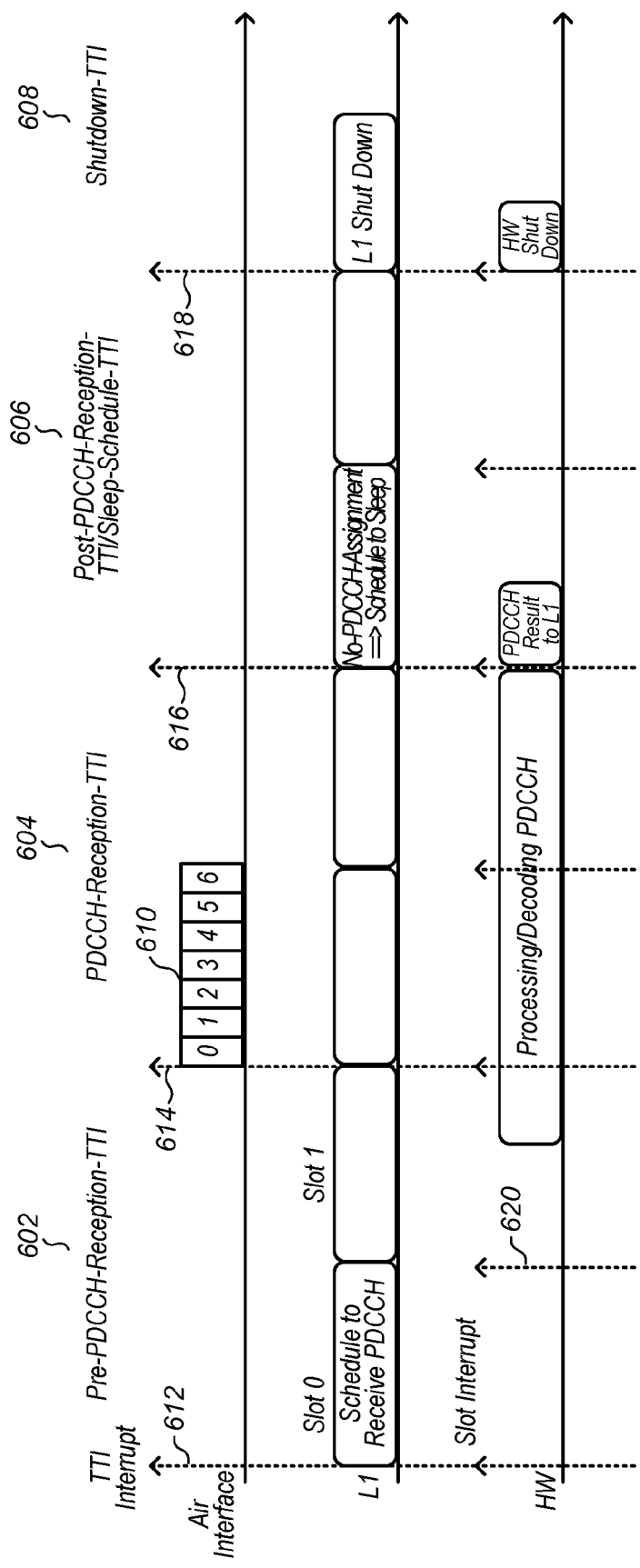
FIGS. 6 and 7 illustrate timing diagrams of embodiments of wakeup processes.

FIG. 6 illustrates an exemplary timing diagram corresponding to this embodiment. As shown, the timing diagram includes four TTIs (Pre-PDCCH-Reception-TTI 602, PDCCH-Reception-TTI 604, Post-PDCCH-Reception-TTI/Sleep-Schedule TTI 606, and Shutdown-TTI 608). As also shown, there are two slots per TTI, and 7 OFDM symbols within each slot. The PDCCH is received in slot 0 of the PDCCH-Reception-TTI 604, labeled as OFDM symbols 0-6 610 at the air interface level. As shown in this diagram, scheduling may be performed at the TTI level in L1, as indicated by the TTI interrupts 612, 614, 616, 618, shown as dotted line arrows each TTI in L1. At the hardware level, interrupts are generated at each slot, as discussed above.

In the Pre-PDCCH-Reception-TTI-Interrupt 612, the L1 may program the hardware (e.g., the RF circuitry and/or baseband circuitry) with the actions required to receive PDCCH. These actions may be activated according to the timestamps provided, and may include: AGC (Automatic Gain Control) loop, TTL (Time Tracking Loop) actions/programming, FTL (Frequency Tracking Loop) actions, and/or other actions so that the hardware can decode PDCCH. In some embodiments, the AGC, TTL, and FTL actions may be implemented in baseband circuitry after RF actions have been performed.

Upon receiving the slot interrupt 620 in slot 1, the hardware may start reading the requests of L1. During this interrupt service routine, all the actions may be programmed with the corresponding timestamps. The actions of AGC, TTL, and FTL may start 3 OFDM symbols before the slot where the PDCCH starts, so they converge before receiving the PDCCH.

In the PDCCH-Reception-TTI-Interrupt 604, the L1 may wait for the results from the hardware. As shown, the hardware may perform decoding the PDCCH in slot 0 and in slot 1. The hardware may send the results to L1 in slot 1.

In the Post-PDCCH-Reception-TTI-Interrupt 606, in L1, the HW-PDCCH-Decoding result may be evaluated. In the case of no PDCCH grant/assignment (e.g., as shown), the system can be scheduled to go to sleep in the next TTI. During this TTI, the hardware may perform no activities.

In the Shutdown-TTI 608, in L1, the sleep mode actions may be executed. In particular, actions to shutdown the various components of the hardware may be executed. In hardware, no activities may be performed as it is being shut down.

As discussed above, in this embodiment, in the case of No-PDCCH-Assignment, 0.5 ms of PDCCH content requires 4 ms of operation of full system functionality, which is a potential source for battery consumption reduction.

In some embodiments, the processing time shown in FIG. 6 may be reduced in various ways. Since the OFDM-symbol-duration (T_ofdm) is the smallest time resolution unit in the system, it may be used for scheduling tasks, allowing the system to be more responsive in deciding to switch to sleep in case of the No-PDCCH-Assignment. Additionally, the schedule with T_ofdm resolution may be used only if it is required, rather than using interrupts on a schedule when there is no task or data to transmit. Thus, the system may have variable schedule durations; T_frame, T_slot, and TTI, and variable length of T_ofdm. This improvement may allow tailoring of the interrupt duration to exactly match the activity duration: L1 may program the interrupts with the different durations according to the time resolution required for the next activity. For example, L1 may have a task list helping to predict the length of the next activity, allowing L1 to schedule accordingly. Because programming of the interrupt point may be variable in this case, processing of the whole slot for PDCCH may no longer be required. For example, if such a technique were implemented in conjunction with the scenario of FIG. 6, hardware processing may be able stop at the fifth OFDM symbol of the PDCCH-reception-TTI 604, at which point it may be possible to determine that there is No-PDCCH-Assignment.

Figure 7:
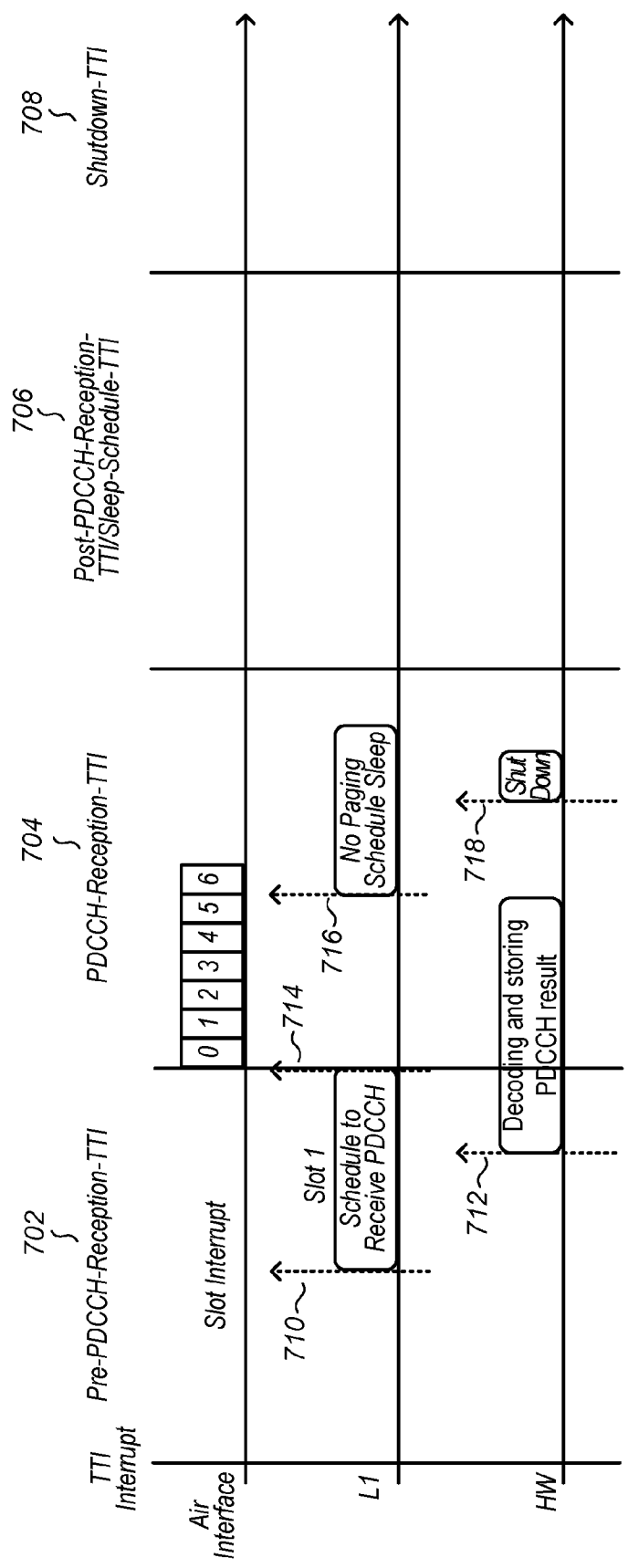

FIG. 7 illustrates an exemplary timing diagram of some embodiments in which the processing time shown in FIG. 6 is reduced. As shown, L1 may be slot driven in this instance of time since there is no need to have a TTI-interrupt, which in this case would result in one slot (slot 0 of Pre-PDCCH-Reception-TTI 702) of no activity. Accordingly, scheduling may be performed at a slot interrupt 710 in slot 1 in the pre-PDCCH-reception-TTI 702 to schedule the activity of L1. L1 may program a hardware interrupt 712 which should be raised after 3 OFDM-symbols to trigger the hardware to decode the PDCCH according to the tasks scheduled by L1 in its previous slot interrupt 710.

In the PDCCH-Reception-TTI 704, in L1 slot interrupt 714, the next interrupt 716 may be programmed to be raised at 6 OFDM symbols. The hardware may store the PDCCH result at the end of its processing, which may include 3+5+1 OFDM symbols without any interruption, in contrast to the scenario shown in FIG. 6, in which interrupts are raised at each slot boundary. The next L1 interrupt 716 may be raised at 6 symbols (prior to the full 7 OFDM symbols of PDCCH) to allow L1 to look at the results of the PDCCH decoding and to schedule the sleeping process (if appropriate, e.g., in the case of no-PDCCH-assignment). Thus, L1 may schedule a hardware interrupt 718 for 3 OFDM symbols after serving the L1 interrupt 716 to allow the hardware to shut down its components. In this case, L1 and HW may be shut down/ asleep prior to the end of the PDCCH-Reception-TTI 704, and may thereby avoid unnecessary power consumption in the Post-PDCCH-Reception-TTI/Sleep-Schedule-TTI 706 and in the Shutdown-TTI 708.

Thus, according to the embodiments shown in FIG. 7, the process of decoding the PDCCH and shutting down the system may take only 1.36 ms instead of 4 ms, which may save 66% of the power consumed during a No-PDCCH-Assignment scenario compared to the third embodiment. Additionally, using programmable interrupts with OFDM-symbol level timing resolution may allow the whole system to be responsive and flexible enough to map the next activity duration into a precise interrupt duration. Further, the total number of interrupts in L1 and hardware may be reduced. Constant TTI interrupts may not be required any longer, and because interrupts may have a large overhead power-wise, battery life may be improved. Additionally, the software may be simpler since it may not serve another level of interrupts every TTI.

Thus, according to the embodiments shown in FIG. 7, scheduling for processing the PDCCH may now be OFDM-symbol-based and not slot or TTI based, which may allow the system to stop decoding the PDCCH after 5 symbols and use the last two symbols in the slot to schedule sleep mode.

Figure 8:
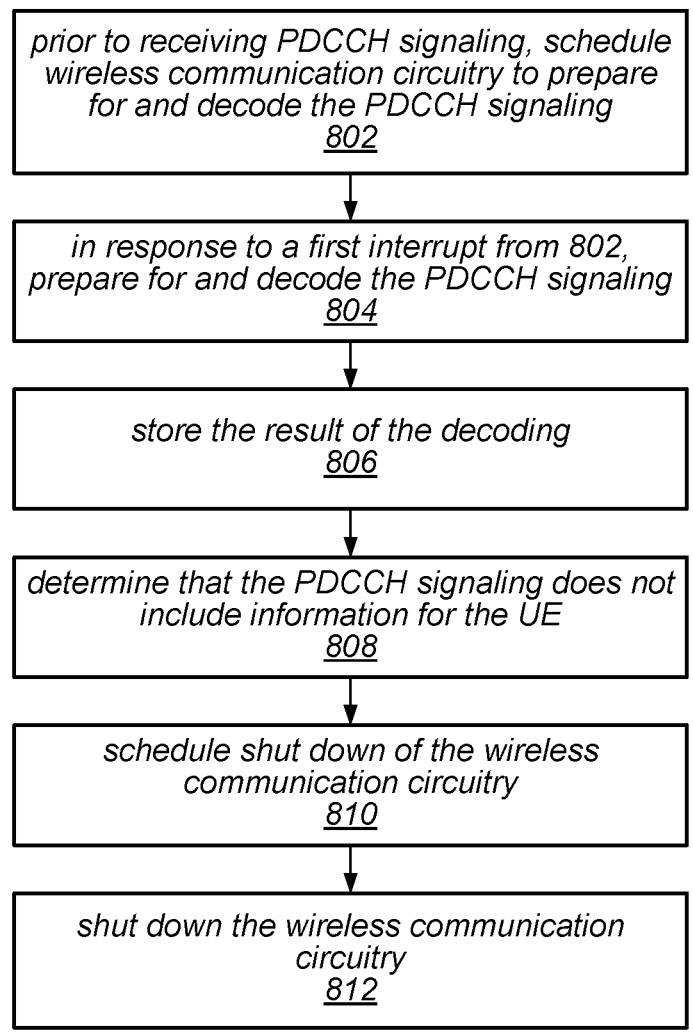
FIG. 8 is a flowchart diagram illustrating an exemplary method for implementing an adaptive sleep schedule for PDCCH decoding, according to some embodiments.

FIG. 8—Adaptive Sleep Schedule for PDCCH Decoding

FIG. 8 is a flowchart diagram illustrating a method for implementing adaptive sleep scheduling for control signaling decoding. The method may be performed by a UE device (such as UE 106), e.g., using the systems and methods discussed above. More generally, the method shown in FIG. 8 may be used in conjunction with any of the systems or devices shown in the above Figures, among other devices. In various embodiments, some of the method elements shown may be performed concurrently, in a different order than shown, substituted for by other elements, or may be omitted. Note also that additional method elements may also be performed as desired. The method may be performed as follows.

In 802, prior to receiving control signaling (such as physical downlink control channel (PDCCH) signaling), the wireless communication circuitry may be scheduled to prepare for and decode the control signaling. Scheduling the wireless communication circuitry may include dynamically preparing a first interrupt (e.g., a first hardware interrupt) for the wireless communication circuitry to perform the preparing for and the decoding of the control signaling. Dynamically preparing the first hardware interrupt distinguishes over the static interrupts discussed above in that the first hardware interrupt is prepared or scheduled in response to determining that an action should be taken. In contrast, the static interrupts discussed above occur on a periodic and pre-determined schedule and arrive regardless of whether an action should be taken. Thus, in the method of FIG. 8, interrupts may not be automatically scheduled for each slot and/or TTI, but may be scheduled dynamically, e.g., only when needed.

At least in some instances the first hardware interrupt (and other dynamically prepared interrupts according to this disclosure) may have finer timing resolution than slot or TTI level, such as OFDM symbol duration level timing resolution. Note that such OFDM symbol duration level timing resolution may remain optional, and that coarser level timing resolution for interrupts may also be used if and when determined to be appropriate; in other words, at least in some embodiments, a variety of interrupt timing resolutions may be possible.

Preparation for the control signaling may include requesting/warming up modules providing AGC, TTL, FTL, channel estimation, etc. which may be performed by RF circuitry and/or baseband circuitry, as desired. In some embodiments, the preparation for the control signaling may be scheduled a few (e.g., three) OFDM symbols before cotnrol signaling is transmitted, which may provide sufficient time for the components used to decode the control signaling to be readied.

The scheduling may be implemented by hardware and/or software of the UE. For example, the scheduling may be performed by L1 software executing on a processor of the UE, such as a L1 processor in the baseband circuitry, as desired. Other processors or implementations are also envisioned. In some instances, multiple levels of interrupts and scheduling may be used. For instance, in addition to the first interrupt noted above, which according to some embodiments may be a first hardware interrupt to schedule RF components to prepare for and decode the control signaling, a first L1 interrupt scheduling the L1 software to prepare the first hardware interrupt may be programmed (e.g., prior to the first hardware interrupt). The first L1 interrupt may also schedule subsequent L1 activities/interrupts, in some instances, such as those described further below herein.

In 804, in response to the first hardware interrupt, the wireless communication circuitry may prepare for and decode the control signaling. In some embodiments, the control signaling may be decoded prior to completion of all symbols of the slot in which the control signaling is present. For example, according to some embodiments, PDCCH signaling may be decoded after 6 OFDM symbols. Note that at least in some instances, the first hardware interrupt may be prepared such that an interrupt duration for the first hardware interrupt is selected to match the expected hardware activity duration to prepare for and decode the control signaling. This may be facilitated by the use of a task list that indicates the expected activity duration of various hardware and/or software activities, such as preparing for and decoding PDCCH signaling. For example, in one set of embodiments, the first hardware interrupt may schedule hardware activity for nine OFDM symbols (e.g., 3 symbols to prepare for decoding the PDCCH, 5 symbols for decoding the PDCCH, and 1 symbol for storing the results of decoding the PDCCH). Any number of other interruption durations may also or alternatively be used according to various possible implementations, as desired.

In 806, after decoding the control signaling, the result of the decoding may be stored, e.g., for analysis by L1. As noted above, the results of the decoding may be stored prior to the end of the slot in which the control signaling is present, e.g., after 6 OFDM symbols in an exemplary embodiment in which the control signaling includes PDCCH signaling.

In 808, the result of the decoding may be analyzed, e.g., by L1 software of the UE. In some embodiments, a second L1 interrupt may be programmed (e.g., as part of L1 activities from the first L1 interrupt or an intermediary L1 interrupt) to schedule the analysis of the control signaling decoding results. Since the results may be available prior to the end of the slot in which the control signaling is present, at least in some embodiments the second L1 interrupt may be programmed to occur between slot boundaries, for example after the 6th OFDM symbol of a slot in which PDCCH signaling is present. This analysis may include determining that the control signaling does not comprise information for the UE. For example, it may be determined that there is no PDCCH assignment for the UE included in PDCCH signaling decoded by the wireless communication circuitry. The second L1 interrupt may also allow the L1 software to schedule the sleeping process and prepare a second hardware interrupt, as subsequently described.

In 810, in response to determining that the control signaling does not include information for the UE, the wireless communication circuitry may be scheduled to shut down, e.g., by the L1 software. This scheduling may include dynamically preparing the second hardware interrupt to shut down hardware components of the wireless communication circuitry. As with at least some other interrupts described herein, the second hardware interrupt may be programmed to occur between slot boundaries, e.g., at an OFDM symbol duration level of timing resolution. The L1 software may also execute sleep actions and enter a low power operational state.

In 812, in response to the second hardware interrupt, the wireless communication circuitry may be shut down. In some embodiments, the wireless communication circuitry (e.g., some or all of the components of the RF circuitry and/or baseband circuitry) may be shut down prior to the end of TTI in which the PDCCH is present.

Note that the method of FIG. 8 may be repeated any number of times. For example, if desired, the method of FIG. 8 (or a variation thereof) may be used on each occasion that the UE decodes control signaling and determines that there is no information for the UE included in the control signaling (such as in the case of PDCCH signaling that does not include a PDCCH assignment for the UE, which as previously noted may represent a substantial majority of the occasions that the UE decodes PDCCH signaling, at least in some embodiments).

Note further that aspects of the method of FIG. 8 may additionally or alternatively be applied in other circumstances than when control signaling does not include information for the UE. For example, dynamically programmable hardware and/or software interrupts provided at fine or variable timing resolution levels may also or alternatively be used in cases when a UE does receive a PDCCH assignment (e.g., to schedule subsequent activities relating to the PDCCH assignment) or other control signaling relating to the UE, if desired.

Thus, it may be possible to attain substantial ongoing power consumption savings relative to techniques utilizing static/periodic interrupts with coarser timing resolution such as slot- or TTI-level timing resolution, both for PDCCH signaling and for other wireless communication activities.

In the following further exemplary embodiments are provided.

One set of embodiments may include a method, comprising: at a user equipment device (UE) comprising wireless communication circuitry for communicating with a cellular network: prior to receiving physical downlink control channel (PDCCH) signaling, scheduling the wireless communication circuitry to prepare for and decode the PDCCH signaling, wherein said scheduling the wireless communication circuitry comprises dynamically preparing a first interrupt for the wireless communication circuitry to perform the preparing and the decoding; in response to the first interrupt, preparing for and decoding the PDCCH signaling using the wireless communication circuitry; after decoding the PDCCH signaling, storing a result of the decoding; analyzing the result of the decoding, wherein said analyzing the result of the decoding comprises determining that the PDCCH signaling does not comprise information for the UE; in response to determining that the PDCCH signaling does not comprise information for the UE, scheduling the wireless communication circuitry to shut down, wherein said scheduling the wireless communication circuitry to shut down comprises dynamically preparing a second interrupt to shut down the wireless communication circuitry; in response to the second interrupt, shutting down the wireless communication circuitry.

According to some embodiments, said scheduling the wireless communication circuitry to prepare for and decode the PDCCH signaling, said analyzing the result of the decoding, and said scheduling the wireless communication to shut down is performed by layer 1 (L1) software executing on a processor of the UE.

According to some embodiments, the processor comprises an L1 processor comprised in baseband circuitry of the UE.

According to some embodiments, the first and second interrupts are both dynamically prepared, wherein the UE does not provide interrupts each slot and/or TTI.

According to some embodiments, the first interrupt and/or the second interrupt are scheduled at a symbol duration resolution.

According to some embodiments, the first interrupt is scheduled 3 OFDM symbols prior to PDCCH signaling reception.

According to some embodiments, decoding the PDCCH signaling is performed after 6 OFDM symbols of the PDCCH.

According to some embodiments, the PDCCH signaling is received within a first transmission time interval (TTI), wherein shutting down the wireless communication circuitry is performed within the first TTI.

According to some embodiments, the wireless communication circuitry comprises radio frequency circuitry and baseband circuitry.

Another set of embodiments may include a user equipment device (UE), comprising: radio frequency (RF) circuitry; baseband circuitry coupled to the RF circuitry; and a processor coupled to the RF circuitry and the baseband circuitry; wherein the UE is configured to perform any or all parts of any of the methods of the preceding examples.

A further exemplary set of embodiments may include a non-transitory computer accessible memory medium comprising program instructions which, when executed at a device, cause the device to implement any or all parts of any of the methods of the preceding examples.

A still further exemplary set of embodiments may include a computer program comprising instructions for performing any or all parts of any of the methods of the preceding examples.

Yet another exemplary set of embodiments may include an apparatus comprising means for performing any or all of the method elements of any of the preceding examples.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs. For example, some or all of the units included in the UE may be implemented as ASICs, FPGAs, or any other suitable hardware components or modules.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus configured for use in a wireless user equipment device (UE), comprising:
a processing element configured to:
determine hardware interrupt timing of a first hardware interrupt based on hardware activity durations for a plurality of possible hardware activities;
prepare the first hardware interrupt scheduling wireless communication circuitry to decode control channel signaling;
decode the control channel signaling using the wireless communication circuitry based on the first hardware interrupt;
determine that the control channel signaling does not comprise information for the UE;
prepare a second hardware interrupt scheduling shut down of the wireless communication circuitry based on determining that the control channel signaling does not comprise information for the UE; and
shut down the wireless communication circuitry in response to the second hardware interrupt, wherein the first hardware interrupt and the second hardware interrupt have an orthogonal frequency division multiplexing (OFDM) symbol duration level of timing resolution, and wherein the first hardware interrupt and the second hardware interrupt are dynamically prepared to match hardware activity duration.

2. The apparatus of claim 1, wherein the first hardware interrupt and the second hardware interrupt are prepared by L1 software, wherein the processing element is further configured to:
prepare a first L1 interrupt scheduling the L1 software to prepare the first hardware interrupt in expectation of the control channel signaling; and
prepare a second L1 interrupt scheduling the L1 software to analyze results of decoding the control channel signaling,
wherein at least one of the first L1 interrupt and the second L1 interrupt have an OFDM symbol duration level of timing resolution.

3. The apparatus of claim 1,
wherein the first hardware interrupt schedules the wireless communication circuitry to begin preparing to decode the control channel signaling a plurality of OFDM symbols prior to a first OFDM symbol of the control channel signaling to provide hardware warmup time.

4. The apparatus of claim 1,
wherein the first hardware interrupt schedules the wireless communication circuitry to store results of decoding the control channel signaling prior to an end of a slot in which the control channel signaling is received.

5. The apparatus of claim 1,
wherein the control channel signaling comprises physical downlink control channel (PDCCH) signaling according to LTE.

6. A method, comprising:
at a user equipment device (UE) comprising wireless communication circuitry for communicating with a cellular network:
prior to receiving physical downlink control channel (PDCCH) signaling, scheduling the wireless communication circuitry to prepare for and decode the PDCCH signaling, wherein said scheduling the wireless communication circuitry comprises dynamically preparing a first interrupt for the wireless communication circuitry to perform the preparing for and the decoding of the PDCCH signaling;
in response to the first interrupt, preparing for and decoding the PDCCH signaling using the wireless communication circuitry;
storing a result of decoding the PDCCH signaling;
analyzing the result of decoding the PDCCH signaling, comprising determining that the PDCCH signaling does not comprise information for the UE;
in response to determining that the PDCCH signaling does not comprise information for the UE, scheduling the wireless communication circuitry to shut down, wherein said scheduling the wireless communication circuitry to shut down comprises dynamically preparing a second interrupt to shut down the wireless communication circuitry;
in response to the second interrupt, shutting down the wireless communication circuitry, wherein said scheduling the wireless communication circuitry to prepare for and decode the PDCCH signaling, said analyzing the result of decoding the PDCCH signaling, and said scheduling the wireless communication to shut down is performed by layer 1 (L1) software executing on a processor of the UE.

7. The method of claim 6,
wherein the processor comprises an L1 processor comprised in baseband circuitry of the UE.

8. The method of claim 6,
wherein the first and second interrupts are both dynamically prepared, wherein the UE does not provide periodic interrupts on a slot and/or TTI basis.

9. The method of claim 6,
wherein the first interrupt and/or the second interrupt are scheduled at an orthogonal frequency division multiplexing (OFDM) symbol duration resolution.

10. The method of claim 6,
wherein the first interrupt is scheduled 3 orthogonal frequency division multiplexing (OFDM) symbols prior to PDCCH signaling reception.

11. The method of claim 6,
wherein decoding the PDCCH signaling is complete after 6 OFDM symbols of the PDCCH.

12. The method of claim 6,
wherein the PDCCH signaling is received during a first transmission time interval (TTI), wherein shutting down the wireless communication circuitry is performed within the first TTI.

13. The method of claim 6, wherein the wireless communication circuitry comprises radio frequency circuitry and baseband circuitry.

14. A user equipment device (UE), comprising:
radio frequency (RF) circuitry;
baseband circuitry coupled to the RF circuitry; and
a processor coupled to the RF circuitry and the baseband circuitry;
wherein the UE is configured to:
dynamically program a first interrupt scheduling the RF circuitry to prepare for and decode physical downlink control channel (PDCCH) signaling, wherein dynamically programming the first interrupt comprises selecting an interrupt duration for the first interrupt to match an expected hardware activity duration to prepare for and decode the PDCCH signaling;
prepare for and decode the PDCCH signaling using the RF circuitry in response to the first interrupt;
determine that the PDCCH signaling does not include an assignment for the UE;
dynamically program a second interrupt scheduling the RF circuitry to shut down based on determining that the PDCCH signaling does not include an assignment for the UE; and
shut down the RF circuitry in response to the second interrupt.

15. The UE of claim 14,
wherein the first interrupt and the second interrupt have orthogonal frequency division multiplexing (OFDM) symbol duration timing resolution.

16. The UE of claim 14, wherein the first interrupt and the second interrupt comprise hardware interrupts scheduling RF circuitry activity, wherein the UE is further configured to:
dynamically program a first layer-1 (L1) interrupt scheduling the baseband circuitry to program the first hardware interrupt scheduling the RF circuitry to prepare for and decode the PDCCH signaling; and
dynamically program a second L1 interrupt scheduling the baseband circuitry to analyze results of decoding the PDCCH signaling.

17. The UE of claim 14,
wherein the PDCCH signaling occurs during a first transmission time interval (TTI),
wherein the RF circuitry is shut down in response to the second interrupt prior to an end of the first TTI,
wherein the baseband circuitry is also shut down prior to the end of the first TTI.

* * * * *